CLAMP STRUCTURE FOR METAL BANDS

Original Filed Oct. 4, 1961 2 Sheets-Sheet 1

INVENTORS.
RAYMOND L. THURSTON
BY HOWARD M. SMITH
Justin E. Macklin
ATTORNEY.

CLAMP STRUCTURE FOR METAL BANDS

Original Filed Oct. 4, 1961 2 Sheets-Sheet 2

INVENTORS.
RAYMOND L. THURSTON
HOWARD M. SMITH
BY Justin E. Macklin
ATTORNEY.

United States Patent Office

Re. 26,211
Reissued May 23, 1967

26,211

CLAMP STRUCTURE FOR METAL BANDS

Raymond L. Thurston, Detroit, and Howard M. Smith, Holly, Mich., assignors to Republic Industrial Corporation, Newark, N.J., a corporation of Delaware Original No. 3,106,757, dated Oct. 15, 1963, Ser. No. 142,971, Oct. 4, 1961. Reissue No. 25,769, dated Apr. 27, 1965, Ser. No. 377,797, May 15, 1964. This application for reissue Oct. 12, 1965, Ser. No. 497,599
1 Claim. (Cl. 24—20)

Matter enclosed in heavy brackets [ ] appears in the original patent but forms no part of the first and this reissue specification; matter printed in italics indicates the additions made by the first reissue; matter enclosed in double heavy brackets [[ ]] appears in the first reissue patent but forms no part of this reissue specification; matter printed in bold face (except reference figures) indicates the additions made by this reissue.

This invention relates to clamping bands formed of flat strips of resilient metal having a portion thereof arranged in a clamping formation for exerting a continuous tension on the band when in use.

An illustration of such a clamping band is that of a clamping ring for tightly embracing a hose and exerting a circumferential and inwardly radial pressure for holding the hose tightly onto a rigid tubular member of nipple for substantially permanent connection.

The primary object of the invention is to provide in a clamping band an offset portion of such shape that it will exert a tension on the band, and which because of its novel shape will resist forces tending to separate or spread it with a much higher degree of holding power than analogous clamping or crimping configurations heretofore used.

A related object of the invention is to create a novel shape or formation which may be readily partially formed in a preliminary step, and which may then be both tightened and shaped to maintain a permanent holding position, with simple means and within a single shaping and tightening step.

To illlstrate the invention, we have shown and described it herein as applied to a hose clamp, such as is used in hydraulic systems, an example of which is an automobile hydraulic brake system, and which may be readily applied to the hose. As indicated, our novel clamp may be quickly and easily clamped tightly in its holding position, and it will then permanently exert a clamping pressure on the hose uniformly throughout the circumference of the band.

The illustrative clamping ring is a thin band of steel or metal having like properties of resiliency and strength. Before clamping, such a ring is slightly larger in circumference than the hose or other object to which it is to be applied. It has a pre-formed offset lug portion, having an outer side or bridging reach substantially parallel with the band and two separated sides joining with the band at a slightly converging angle of a keystone configuration, the points of juncture with the band being separated a substantially greater distance than when in the clamping closed position.

A novel characteristic of this keystone shape loop is that when it is clamped onto a hose or other object to which it may be applied, the forces tending to spread it are resisted by combined factors. Its normal resistance to bending from its clamped shape is utilized to a better advantage. The inturned converging sides are to a considerable degree subjected to compressions, while the bridge portion between them is subjected to tension.

In carrying out our invention the following considerations of commercial importance have been attained, in each instance to a degree not heretofore possible with prior known configurations.

It may be cheaply manufactured. The band or clamp may be easily applied, installed and tightened in clamping position. The weight and cost of materials and simplicity of manufacturing results in substantial advantages, one of the most important being that the novel form of clamp holds with greater force and resists higher spreading pressures than would be possible with the same size, width and thickness of band of any previously known constructions. The finished article has an improved appearance.

A simple tool of preferred design for forming the finished keystone configuration is intended to be presented in another application.

An illustrative preferred embodiment of our present invention is shown in the accompanying drawings to which the following description relates, and in which.

As shown, the ring is formed of a flat narrow thin band, and preferably of steel or other material having like properties. That is, the band should have good tensile strength and be resilient while being capable of retaining a permanent set when bent to the desired shape.

Figure 1:
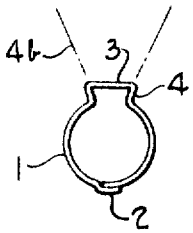
FIG. 1 is an edge elevation of a preferred form of our novel clamping ring prior to the re-forming and clamping.
Figure 2:
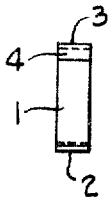
FIG. 2 is a side elevation of the same;.

Such a ring constitutes a circular or cylindrical band 1 having its ends secured in any suitable fashion, such as by welding at the overlapped formation, indicated at 2. It has formed therein an offset loop having a straight bridge portion 3 and relatively shorter sides 4 joining the circular portion as shown. In the condition shown in FIG. 1, the circular portion is of a size suitable for being easily slid over the end of a hose or other article to be clamped, or on which it is to be tightened, and after which the novel angular keystone tightening formation is effected.

Figure 3:
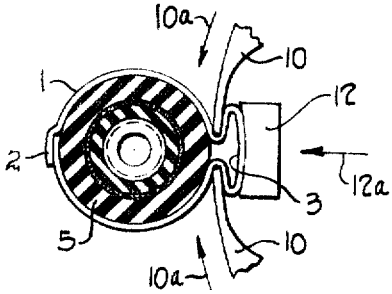
FIG. 3 is an enlarged elevation of our ring showing it being clamped upon a high pressure hose embracing a metal stem or nipple of a connection member.

Referring to FIG. 3, a high pressure type hose 5 is shown as having internal reinforcement and here embracing a metal tubular connection or nipple of a fitting. When placed in position on the hose, a pair of pincher jaws 10 may engage the clamping band at the corners between the outwardly extending side members 4 of the loop and the circumference of the ring. Simultaneously, a holding force is applied to a member 12 pressing against the bridge portion 3 in the direction of the arrow 12a, assuring that the sides 4 of the loop will assume the inturned angular position as there appears, while preventing the bridge portion 3 from buckling or folding outwardly.

Figure 4:
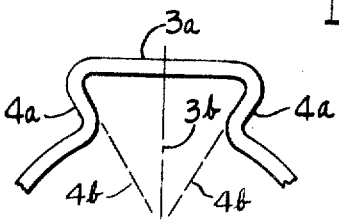
FIG. 4 is a fragmentary enlarged view of the keystone shape loop before crimping and tightening.

A preferred configuration of the loop before the clamping appears more clearly in FIG. 4, in which the sides, indicated by the lines 4a, converge inwardly toward the center of the ring, as indicated by broken lines 4b, while the bridge portion 3a is preferably substantially flat or straight and at right angles to a medial radial line 3b.

The members 10 may comprise the jaws of a pair of pinchers or pliers which may be a specially constructed tool equipped with an anvil or back-up block 12. This block 12 preferably has a relative inward movement as the sides and inner corners of the offset or loop are brought close together in the final clamping position. As above indicated, such a tool will be shown, described and claimed in another application.

It is considered sufficient for the present purposes to point out that the clamping forces applied are concentrated at the inner corners of the sides 4 of the loop as the band is tightened around the hose by moving the members 10—10 in the direction of the arrows 10a. This closing movement of the inner ends of these jaws 10 may simultaneously cause the anvil block or pusher 12 to move inwardly toward the ring and hose. This anvil block may have a slight curvature at the face which engages the bridge portion 3. When the clamping is completed and the resiliency of the hose exerts both radial and circumferential forces, the arms 4 of the keystone-shaped clamp will be put under compression with a tendency to spread slightly and thus flatten any slight arch in the bridge 3, as indicated in broken lines 3c in FIG. 5.

While we refer hereinafter to the shape of the clamping and tensioning loop formed on the clamping band as being "substantially triangular" in describing that shape and various features thereof in the particular clamping condition shown in FIGS. 3 and 5 and diagrammatically in FIG. 10, this shape is more accurately characterized as a "keystone" shape inasmuch as the gap between the converging straight sides 4 of the loop adjacent the apex of the incomplete triangular formation, where the straight sides join the band portion to be tensioned, is not completely closed. The size of the clamping band should be selected relative to the range of sizes of the articles or assemblies to be clamped thereby so that the clamping forces will create the desired tension in the ring portion of the band and compression of the article being clamped before that gap is completely closed, and in any event, by the time it is completely closed. Obviously, because of the elastic resilience of the article or assembly being clamped, some slight spring back will generally occur and produce at least a slight reopening of the gap even in the extreme case in which the gap is momentarily completely closed during the application of the clamping forces.

The holding action of our clamp minimizes the reliance for holding pressure upon the stiffness of the metal resisting bending. The configuration results in a combination of resistance by the sides 4 being under compression, while a large part of the spreading force is resisted by tension on the connecting bridge 3. The improved holding power is also increased by reason of the shape whereby the forces tending to bend the clamp are resisted close to the circumference of the ring, which is being subjected to circumferential tension. Obviously, the more closely it is practical to have this bridge portion 3 positioned to the circumference of the ring and the more nearly the sides 4 of the clamp are folded toward the ring, that is, the more acute the angles become between the sides and the circumference, the greater will be the resistance to spreading the clamping head or loop. However, there are practical considerations of compromise in respect to the bending and positioning of the sides 4 and bridge 3, and to the resiliency of the holding action.

The more nearly to complete flattening of the bridge with the legs 4 against the circumference of the ring, the less spring or spread would occur at the opening N, and theoretically, the greater the holding power. We have found in practice that adjustability, allowance for variation in the diameters of hose, continued resilient holding action, and other factors, make it desirable to form a loop of approximately the shape shown in FIGS. 5 and 10.

Figure 6:
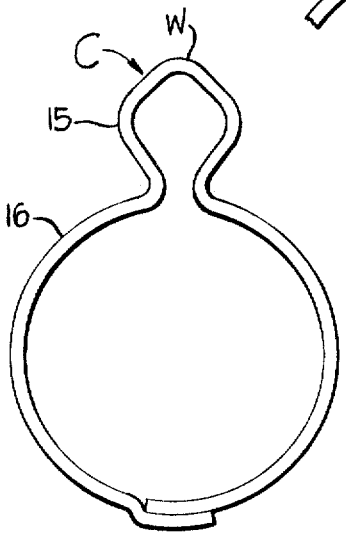
FIG. 6 is a similar view on the same scale as FIG. 5, showing a type of clamping loop heretofore widely used.

Further illustrating the unique advantage of the novel shape of this clamp, we have shown in FIG. 6 a type of loop heretofore widely used on hose clamping rings, and which may be generally partially cylindrical or somewhat elongated in a radial direction. It is usually first formed as a U-shape which is then squeezed into a clamping or holding loop 15 having a resulting configuration, such as shown at C. Here it will be seen that whether the loop is substantially circular or modified somewhat, as there shown, the resistance to circumferential enlargement or expansion of the ring portion 16 is concentrated substantially at the part of the loop farthest from the ring and the center of the hose. The sides of such a loop, acting as relatively stiff levers tending to be separated or spread by circumferential tension on the ring, resist this force only by the stiffness of the band at the bend W.

Figure 7:
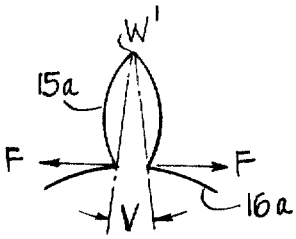
FIG. 7 is a line diagram illustrating the manner in which the spreading forces act upon and are resisted by a loop of the general nature heretofore used, such as the type shown in FIG. 6.

Diagrammatically illustrating this in FIG. 7, the forces tending to spread the loop when the ring is clamped upon the hose are exerted in the direction of the arrows FF, and the sides of the loop may be considered as relatively stiff members in effect resisting this spreading action on the sides of an angle V, indicated by the broken lines in this figure, and thus the resistance is concentrated at the apex of the angle at a point W'.

It is at once apparent that the farther out from the ring circumference, indicated at 16a in this figure, the point W' is located, the less effective would be the holding force which is only by the resistance to bending of the band at that point. In contrast with the illustration of the form of FIGS. 6 and 7, the substantially triangular shape of the clamp of the present invention, appearing in FIGS. 3 and 5, offers very much greater resistance to circumferential stress.

Figure 5:
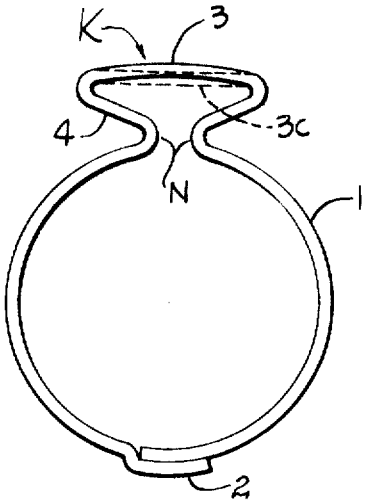
FIG. 5 is an enlarged edge elevation showing the configuration of the tensioning clamping loop when in use.
Figure 10:
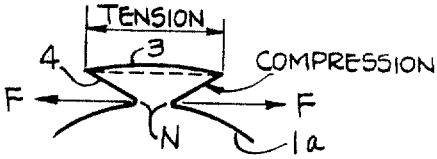
FIG. 10 is a diagrammatic view illustrating the manner in which the forces act upon and are resisted by our novel angular shape, corresponding to FIGS. 3 and 5.

Comparing FIGS. 5 and 10 with FIGS. 6 and 7, it will be seen that the forces pulling open the gap or neck opening N of our novel clamp are resisted at points much closer to the band or circle of the circumference indicated at 1a. Furthermore, both geometrically and mechanically considered, here the forces F, indicated in FIG. 10, many tend to spread the angle between the side members and the bridge somewhat, but the straight loop sides 4 are under a compression, while the bridge resists this circumferential force under tension, and obviously this bridge portion is not extensible. It may be noted that a slight tendency to bend inwardly as the neck opening N spreads slightly will tend to flatten and straighten the bridge member 3, as shown in broken lines 3c, but without appreciably permitting the neck opening N to spread.

The superior holding strength and other desirable characteristics of our novel geometrical shape of holding clamp have been proven in a large number of tests. The chart diagrams of FIGS. 8 and 9 illustrate the comparative results as between our "keystone" clamp and types of clamping loop formerly used.

These charts were developed from static tests in which a steel barbed or grooved stem of a fitting was inserted at each end of an appropriate section of hose and clamped with one of our new types of clamps for one series of tests, while similar sections of the same hose were tested in the same manner, using clamps of the former types. The pressure of fluid within the hose was built up at an approximate rate of 250 p.s.i. per minute, until failure occurred. During the build-up both hose and connections were visually inspected for leaking. When failure occurred through leakage or withdrawal of the barbed stem, the internal fluid pressure was recorded.

The variations in the pressures held by each clamp indicates one of the variables, namely, hose tolerances, etc., and the effect on the clamps and testing of this type. Slight variations in hose sizes and strength of reinforcing structure therein produced varying results.

Figure 8:
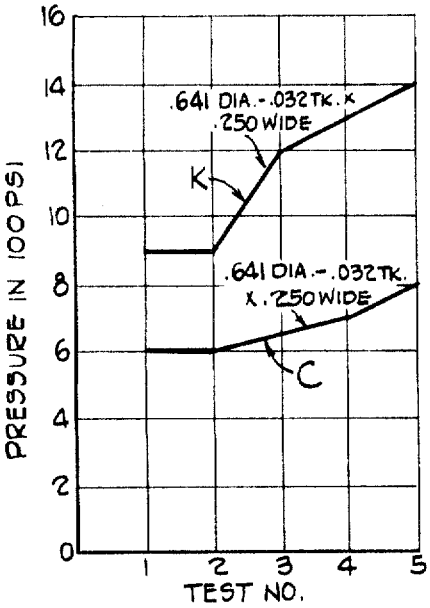
FIG. 8 is a chart diagram showing the results of tests comparing clamping rings of the type having the shape comparable to that heretofore used, such as FIG. 6, with rings having clamping loops formed according to the present invention, and made from the same metal strip stock material.
Figure 9:
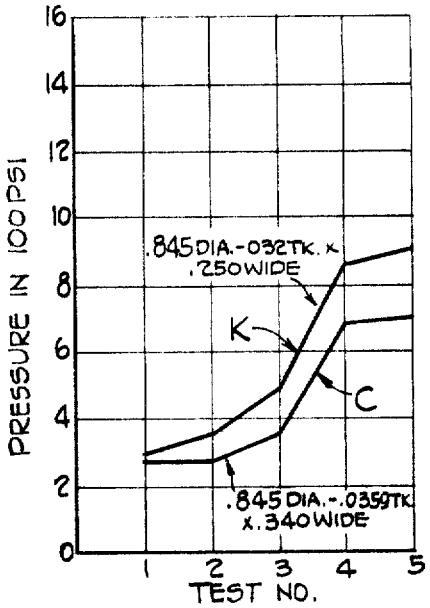
FIG. 9 is a similar chart diagram comparing the pressure resistance of the former type of holding loops with our type, where the former type of rings tested were of the same diameters but were made of heavier strip stock material.

In FIG. 8 these results are charted by the lines C and K. The pressure figures at the left of the chart indicate hundreds of pounds, and results of the several tests are indicated on the vertical lines 1, 2, 3, 4, and 5. The line C indicates failure of the former type of clamp at about 600 pounds pressure on the first two tests, while the line K indicates failure of our "keystone" type on another section of this particular hose at about 900 pounds pressure. Subsequent tests, as indicated on lines 3, 4, and 5 on the chart, were made with different hose, comparing the circular or loop type clamp applied in each case to the same kind and diameter of hose as was used for the comparable test of the clamp of the present invention. In tests 3, 4, and 5, the new "keystone" type held pressures of 1200 to 1400 pounds, while on the same type of hose, the former loop clamps applied to section cut from the same hose, held pressures only up to 800 pounds. The clamping rings tested in these comparative tests were of the same diameter and of the same width and thickness of band. As there indicated, the rings tested and recorded on this chart (of FIG. 8) were .641 inch diameter; .032 of an inch thickness, and .250 of an inch width. These were made from the same steel band.

Similar comparative tests have proven that even when the clamping rings of the former circle loop type of FIG. 6 were made of thicker and wider band material, our new type of clamping rings having the "keystone" shape according to the present invention withstood higher pressures. The former types and our present type were tested on sections cut from the same hose. Such tests were recorded, and corresponding curves C and K of FIG. 9 show the comparative results. It is apparent that the holding strength of the "keystone" clamp formation is greater even when made with lighter weight steel band than where heavier stock is used for clamps having the circular type of loops. Here, the tests recorded, as shown by the line K, were on rings .845 inch in diameter; .032 thick, and .250 wide. The former type rings tested and recorded as indicated by the line C were the same diameter and were .0359 (inch) thick and .340 inch wide, and formed of the same steel material as that used and recorded in the line K.

Figure 11:
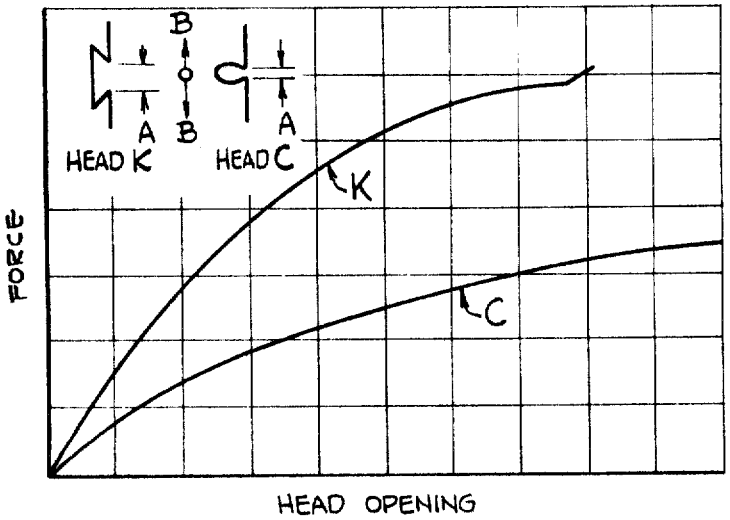
FIG. 11 is a chart of the results of tests comparing the amount of spread of the clamping loops of our keystone clamp with relation to the former type of loops, when subjected to comparable pressures.

Another type of tests more specifically directed to the holding strength of the clamp formation of our invention, compared to the previous circular loop type formed in bands of the same size and material, provides an even more direct comparison. The readings of a number of such tests are indicated on the chart of FIG. 11.

At the upper left hand portion of this chart are indicated diagrammatically our type of clamp "Head K" and former types of clamp "Head C." The opening where the head joins the band is indicated in each case by the arrows A. These tests were made by straight longitudinal pull on bands in which the two types of clamp shape were formed. The readings taken represent measurements of forces in the direction of the arrows B—B, at the upper corner of the chart, applied to formations of "Head K" and to clamping loop formations designated "Head C."

The curve K on the chart (FIG. 11) corresponds to readings taken of forces required to open the head or throat A (corresponding to the gap or opening N of FIG. 5) a given amount. For the same amount of opening, the readings of the force applied to the former types are indicated by the line or curve C. Obviously, there is an approximate uniformity of each "curve," but the tests were so recorded, and our novel clamp "Head K" required approximately twice as much force as type C to cause the clamp loop to yield and spread the opening A any of the distances at which the readings were taken.

Summarizing the proven superiority of the design as compared with former types of crimping or clamping formations, extensive tests of various kinds have proven the following characteristics, the reasons for which are believed to be apparent from the foregoing description as related to the drawings:

The novel type of "keystone" clamping ring or band constitutes an improved structure for both low pressure and relatively high pressure applications for hose clamps, and the like.

The novel "keystone" clamping ring may be made of thinner stock thickness and less width than clamps previously used for the same purpose.

Because of the novel shape shown and described, after the closure the clamp is capable of holding against higher pressures than previous forms of clamps made with comparable size material. This obviously results in a saving of cost of the strip material used.

There are advantages in the lower profile of the loop, that it, the projection beyond the circumference is much less than with a circular or U-shaped loop. For example, it is less likely to be hit, and it is possible to use it in closer quarters.

It is apparent that this formation may be useful for other purposes than hose clamps, for example, it may be applied to take-up holding bands and other mechanical uses, such as in band wrappings of bundles or articles or for containers.

From the foregoing description it will be seen that economy is effected by making possible the meeting of given holding requirements with relatively thinner and narrower bands. Standard types of available band material may be used, for example, low carbon steel ribbon-like strip having a standard hardness of B–65 Rockwell, and that if finished with even a very thin plate coating, this may be rust-resistant, and its clamping formation need not destroy the finish.

The shape and precise dimensions obviously may be varied somewhat. Those approximately as illustrated have been proven most suitable for holding a resilient body and of themselves exerting a continued holding pressure while being capable of resisting the increased pressure, such as that to which hydraulic hose connections are subjected.

Approximate proportions found desirable in such uses are those illustrated and in which it will be observed that, as described, the sides 4 of the loop flare slighly as the ring is finished before the gripping and clamping action, and that the side legs are approximately one-half or less that of the bridge member 3; that after the gripping and clamping action, the radial distance, that is, the minimum distance of the junctions of the straight sides or legs 4 with the ring portion of the band from the bridge 3, is somewhat less—one-half or two-thirds of the length of these legs; that while the corners joining the legs with the band and the bridge portions are small curved portions, they do form, in effect, the acute angles apparent in FIG. 5, as diagrammatically illustrated in FIG. 10.

The crimping formation tightening the "keystone" shape onto the hose, or tightening the band on any article, may be performed simply—by a single motion either with a hand tool or a power tool which may be carried in the hand.

The crimping jaws 10 need only to be associated with means for simultaneously holding or moving an anvil 12 relatively inwardly toward the crimping jaws 10. Thus, not only is the new clamping formation superior, more economical and more effective than shapes heretofore used, but it may be formed and be given its permanent holding set with great facility and rapidity.

Having thus described our invention, what we claim is:

[[1. A clamped article and clamping band assembly [comprising] *comprising* and article and a closed clamping band [of strip metal] having a band portion that is clamped under tension about said article and a clamping and tensioning loop formed on the band portion; said clamping and tensioning loop being of a keystone shape formed by (a) two straight sides of substantially equal length which diverge generally outwardly from said band portion along planes having an obtuse included angle, said straight sides having parallel inner ends extending transversely over the width of the band in spaced apart relation;

(b) a substantially flat, connecting bridge portion extending between parallel outer ends of said straight sides, said bridge portion having a length (between the outer ends of said straight sides) that is at least approximately twice the length of said straight sides (between their inner and outer ends); and (c) an inner pair of fold junctions between said straight sides and said band portion and an outer pair of fold junctions between said straight sides and said bridge portion that are all abrupt, acute angle folds of small fillet radii;

the tension in said band portion tending to spread the inner ends of said straight sides further apart and to open up said acute angle fold junctions but being effectively prevented from doing so by a combination of the stiffness of said band and resistance of said straight sides to compression forces that are maintained by resistance of said bridge portion to tension forces.]]

[[2. A clamped article and clamping band assembly according to claim 1 in which the distance of said inner pair of fold junctions from their nearest points on said bridge portion is from about one-half to two-thirds of the length of said straight sides.]]

[[3. A clamped article and clamping band assembly according to claim 1 in which said outer pair of fold junction angles are less than 45°.]]

[[4. A hose fitting, and clamping band assembly comprising a length of resilient hose, a metal fitting projecting snugly into the hose, and a closed clamping band [of a strip metal] having a band portion that is clamped under tension about a circumferential zone of said hose that surrounds said fitting so as to form a mechanically tight, pressure resisting, fluid seal between said hose and said fitting, and a clamping and tensioning loop formed on the band portion; said clamping and tensioning loop being of a keystone shape formed by (a) two straight sides of substantially equal length which diverge generally outwardly from said band portion along planes having an acute included angle, said straight sides having parallel inner ends extending transversely over the width of the band in spaced apart relation;

(b) a substantially flat connecting bridge portion extending between parallel outer ends of said straight sides, said bridge portion having a length (between the outer ends of said straight sides) that is at least approximately twice the length of said straight sides (between their inner and outer ends); and (c) an inner pair of fold junctions between said straight sides and said band portion and an outer pair of fold junctions between said straight sides and said bridge portion that are abrupt, acute angle folds of small fillet radii;

the tension in said band portion tending to spread the inner ends of said straight sides further apart and to open up said acute angle fold junctions but being effectively prevented from doing so by a combination of the stiffness of said band and resistance of said straight sides to compression forces that are maintained by resistance of said bridge portion to tension forces.]]

[[5. A hose, fitting and clamping band assembly according to claim 4 in which the distance of said inner pair of fold junctions from their nearest points on said bridge portion is from about one-half to two-thirds of the length of said straight sides.]]

[[6. A hose, fitting, and clamping band assembly according to claim 4 in which said outer pair of fold junction angles are less than 45°.]]

7. A clamping band of ductile material having a band portion that is clampable under tension and an integral clamping and tensioning loop formed on the band portion, said clamping and tensioning loop being of keystone shape defined by two straight sides of substantially equal length folded back relative to their adjacent band portions so as to define inner fold junctions, respectively, said inner fold junctions extending parallel to one another transversely over the width of the band in spaced apart relation, a substantially flat connecting bridge portion extending between parallel outer ends of said straight sides and defining outer fold junctions therewith, respectively, said bridge portion having a length between the outer ends of said straight sides that is at least approximately twice the length of said straight sides, the inner ends of said side portions being movable toward one another and said bridge portion being movable toward said band portion to effect tensioning of said band portion, said inner and outer fold junctions being abrupt, acute angle folds of relatively small fillet radii when said clamping band is in the tensioned condition.

References Cited by the Examiner

The following references, cited by the Examiner, are of record in the patented file of this patent or the original patent.

UNITED STATES PATENTS

| | | | |
|---|---|---|---|
| 83,107 | 10/1868 | Thomas. | |
| 316,062 | 4/1885 | Riessner | 24—257 |
| 1,573,684 | 2/1926 | Dinsmoor | 24—30.5 |
| 1,906,874 | 5/1933 | Platt. | |
| 2,460,963 | 2/1949 | Young | 24—259 X |
| 2,614,304 | 10/1952 | Oetiker | 24—20 |
| 2,849,770 | 9/1958 | Klanscnik | 24—27 |
| 2,947,055 | 8/1960 | McHenry | 24—259 |
| 3,027,128 | 3/1962 | Liberty | 248—74 |
| 3,087,221 | 4/1963 | Armstrong | 24—20 X |

FOREIGN PATENTS

| | | |
|---|---|---|
| 330,437 | 12/1920 | Germany. |
| 858,173 | 12/1952 | Germany. |
| 5,788 | 3/1904 | Great Britain. |

BERNARD A. GELAK, *Primary Examiner.*